United States Patent
Fu

(10) Patent No.: US 11,218,556 B2
(45) Date of Patent: Jan. 4, 2022

(54) METHOD, APPARATUS, USER DEVICE AND SERVER FOR DISPLAYING PERSONAL HOMEPAGE

(71) Applicant: Advanced New Technologies Co., Ltd., Grand Cayman (KY)

(72) Inventor: Xiaozhen Fu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/453,764

(22) Filed: Jun. 26, 2019

(65) Prior Publication Data

US 2019/0320032 A1    Oct. 17, 2019

Related U.S. Application Data

(63) Continuation of application No. PCT/CN2017/116844, filed on Dec. 18, 2017.

(30) Foreign Application Priority Data

Dec. 26, 2016  (CN) .......................... 201611220636.2

(51) Int. Cl.
 *G06F 16/958*  (2019.01)
 *H04L 29/08*  (2006.01)
 (Continued)

(52) U.S. Cl.
 CPC ............ *H04L 67/22* (2013.01); *G06F 3/0484* (2013.01); *G06F 3/0488* (2013.01);
 (Continued)

(58) Field of Classification Search
 CPC ......... G06Q 50/01; H04L 67/22; H04L 67/42; H04L 65/1069; G06F 3/0484; G06F 3/0488; G06F 16/958
 See application file for complete search history.

(56) References Cited

U.S. PATENT DOCUMENTS

| 8,448,072 B1* | 5/2013 | Lai ...................... G06Q 10/107 |
| | | 715/753 |
| 2006/0190117 A1* | 8/2006 | Weczorek ............... H04L 29/06 |
| | | 700/103 |

(Continued)

FOREIGN PATENT DOCUMENTS

| CN | 105074687 | 11/2015 |
| CN | 105283835 | 1/2016 |

(Continued)

OTHER PUBLICATIONS

PCT International Preliminary Report on Patentability in International Application No. PCT/CN2017/116844, dated Jul. 2, 2019, 9 pages (with English translation).

(Continued)

*Primary Examiner* — Daniel Samwel
(74) *Attorney, Agent, or Firm* — Fish & Richardson P.C.

(57) ABSTRACT

This specification describes techniques for displaying a personal home page. One example non-transitory, computer-readable medium includes generating, by a first user device of a first user, a communication session between the first user device and a second user device of a second user by using a social network provided by a server, the communication session being associated with a personal homepage; receiving, by the first user device of the first user, current activity status information of the second user of the personal homepage that is provided by the server, wherein the current activity status information comprises a current activity theme picture or a current activity theme video; and displaying, by the first user device of the first user, the current activity status information in a background area of the personal homepage.

16 Claims, 12 Drawing Sheets

(51) Int. Cl.
*G06F 3/0484* (2013.01)
*G06F 3/0488* (2013.01)
*H04L 29/06* (2006.01)
*G06Q 50/00* (2012.01)

(52) U.S. Cl.
CPC ........... *G06F 16/958* (2019.01); *G06Q 50/01* (2013.01); *H04L 65/1069* (2013.01); *H04L 67/42* (2013.01)

(56) References Cited

U.S. PATENT DOCUMENTS

| | | | |
|---|---|---|---|
| 2007/0186007 A1 | 8/2007 | Field et al. | |
| 2008/0155080 A1 | 6/2008 | Marlow et al. | |
| 2010/0274847 A1* | 10/2010 | Anderson | G06Q 50/01 709/203 |
| 2010/0306679 A1* | 12/2010 | Wu | G06F 16/9562 715/760 |
| 2012/0116550 A1* | 5/2012 | Hoffman | A63B 24/0084 700/91 |
| 2012/0173383 A1* | 7/2012 | Badawiyeh | G06Q 30/0631 705/26.7 |
| 2012/0282995 A1* | 11/2012 | Allen | G06Q 30/0214 463/22 |
| 2013/0332523 A1* | 12/2013 | Luu | G06Q 30/0251 709/204 |
| 2014/0189539 A1 | 7/2014 | St. Clair et al. | |
| 2014/0310624 A1 | 10/2014 | Peng et al. | |
| 2016/0034537 A1* | 2/2016 | Chakra | G06F 16/951 707/770 |
| 2016/0292170 A1* | 10/2016 | Mishra | G06F 3/0482 |

FOREIGN PATENT DOCUMENTS

| | | |
|---|---|---|
| CN | 107038201 | 8/2017 |
| JP | 2002007295 | 1/2002 |
| JP | 2011523486 | 8/2011 |
| JP | 2016133663 | 7/2016 |
| KR | 20070109682 | 11/2007 |

OTHER PUBLICATIONS

PCT International Search Report and Written Opinion in International Application No. PCT/CN2017/116844, dated Mar. 23, 2018, 13 pages (with English translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Extended European Search Report in European Application No. 17886189.4, dated Oct. 7, 2019, 9 pages.

\* cited by examiner ly, the profile picture area 12 is relatively small and can be a square or a circle. The background area 11 is relatively large and can display more content.

METHOD, APPARATUS, USER DEVICE AND SERVER FOR DISPLAYING PERSONAL HOMEPAGE

CROSS-REFERENCE TO RELATED APPLICATIONS

This application is a continuation of PCT Application No. PCT/CN2017/116844, filed on Dec. 18, 2017, which claims priority to Chinese Patent Application No. 201611220636.2, filed on Dec. 26, 2016, and each application is hereby incorporated by reference in its entirety.

TECHNICAL FIELD

The present application relates to the field of network communications technologies, and in particular, to a method, an apparatus, a user device and a server for displaying a personal homepage.

BACKGROUND

A personal homepage is the simplest representation form of a personal website, and is a website created for other people to browse in order to know a person better, communicate with others, and so on.

As shown in FIG. 1, the personal homepage usually includes a profile picture area 11 and a background area 12. A user of the personal homepage usually uploads a picture as a profile picture in the profile picture area 11 of the personal homepage, and can upload another picture as the background in the background area 12. Usually, the profile picture area 12 is relatively small and can be a square or a circle. The background area 11 is relatively large and can display more content.

However, the picture of the background area can represent only a static meaning, and cannot reflect an activity of the user of the personal homepage. As a result, a viewer cannot intuitively learn of an activity of the user of the personal homepage from the personal homepage, and further needs to learn of the activity through another channel (for example, through instant messaging chatting). Consequently, operations are inconvenient and additional system resources are wasted.

SUMMARY

To alleviate the previous technical problem, the present application provides a method, an apparatus, a user device and a server for displaying a personal homepage.

According to a first aspect of implementations of the present application, a method for displaying a personal homepage is provided, and the method includes: receiving current activity status information of a user of a personal homepage that is provided by a server, where the current activity status information includes a current activity theme picture or a current activity theme video; and displaying the current activity status information in a background area of the personal homepage.

According to a second aspect of the implementations of the present application, a method for displaying a personal homepage is provided, and the method includes: monitoring each local application in a running state to obtain a monitoring result; determining current activity status information of a user of a personal homepage based on the monitoring result, where the current activity status information includes a current activity theme picture or a current activity theme video; and sending the current activity status information to a server.

According to a third aspect of the implementations of the present application, a method for displaying a personal homepage is provided, and the method includes: receiving current activity status information of a user of a personal homepage that is sent by a first user device, where the current activity status information includes a current activity theme picture or a current activity theme video; and sending the current activity status information to a second user device, so that the second user device displays the current activity status information in a background area of the personal homepage.

According to a fourth aspect of the implementations of the present application, an apparatus for displaying a personal homepage is provided, and the apparatus includes: a first receiving unit, configured to receive current activity status information of a user of a personal homepage that is provided by a server, where the current activity status information includes a current activity theme picture or a current activity theme video; and a first display unit, configured to display the current activity status information in a background area of the personal homepage.

According to a fifth aspect of the implementations of the present application, an apparatus for displaying a personal homepage is provided, and the apparatus includes: a monitoring unit, configured to monitor each local application in a running state to obtain a monitoring result; a first determining unit, configured to determine current activity status information of a user of a personal homepage based on the monitoring result, where the current activity status information includes a current activity theme picture or a current activity theme video; and a first sending unit, configured to send the current activity status information to a server.

According to a sixth aspect of the implementations of the present application, an apparatus for displaying a personal homepage is provided, and the apparatus includes: a first receiving unit, configured to receive current activity status information of a user of a personal homepage that is sent by a first user device, where the current activity status information includes a current activity theme picture or a current activity theme video; and a first sending unit, configured to send the current activity status information to a second user device, so that the second user device displays the current activity status information in a background area of the personal homepage.

According to a seventh aspect of the implementations of the present application, a user device is provided, and the user device includes: at least one processor; and a memory configured to store an instruction that can be executed by the at least one processor, where the instruction, when executed by the at least one processor, instructs the at least one processor to: receive current activity status information of a user of a personal homepage that is provided by a server, where the current activity status information includes a current activity theme picture or a current activity theme video; and display the current activity status information in a background area of the personal homepage.

According to an eighth aspect of the implementations of the present application, a user device is provided, and the user device includes: at least one processor; and a memory configured to store an instruction that can be executed by the at least one processor, where the instruction, when executed by the at least one processor, instructs the at least one processor to: monitor each local application in a running state to obtain a monitoring result; determine current activity status information of a user of a personal homepage based on the monitoring result, where the current activity status information includes a current activity theme picture or a current activity theme video; and send the current activity status information to a server.

According to a ninth aspect of the implementations of the present application, a server is provided, and the server includes: at least one processor; and a memory configured to store an instruction that can be executed by the at least one processor, where the instruction, when executed by the at least one processor, instructs the at least one processor to: receive current activity status information of a user of a personal homepage that is sent by a first user device, where the current activity status information includes a current activity theme picture or a current activity theme video; and send the current activity status information to a second user device, so that the second user device displays the current activity status information in a background area of the personal homepage.

In the implementations of the present application, the current activity status information of the user of the personal homepage is displayed in the background area of the personal homepage, to help a viewer intuitively learn of an activity of the user of the personal homepage from the personal homepage, thereby preventing the viewer from learning of the activity of the user of the personal homepage through another channel, and saving system resources.

It should be understood that the previous general description and the following detailed description are merely an example for explanation, and do not limit the present application.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Implementations described in the following example implementations do not represent all implementations consistent with the present application. Instead, the implementations are only examples of apparatuses and methods consistent with some aspects of the present application that are described in detail in the appended claims.

The terms used in the present application are merely for illustrating specific implementations, and are not intended to limit the present application. The terms "a" and "the" of singular forms used in the present application and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in the present application to describe various types of information, the information is not limited to the terms. These terms are only used to differentiate information of a same type. For example, without departing from the scope of the present application, first information can also be referred to as second information, and similarly, the second information can also be referred to as the first information. Depending on the context, for example, the word "if" used here can be explained as "while", "when", or "in response to determining".

Figure 1:
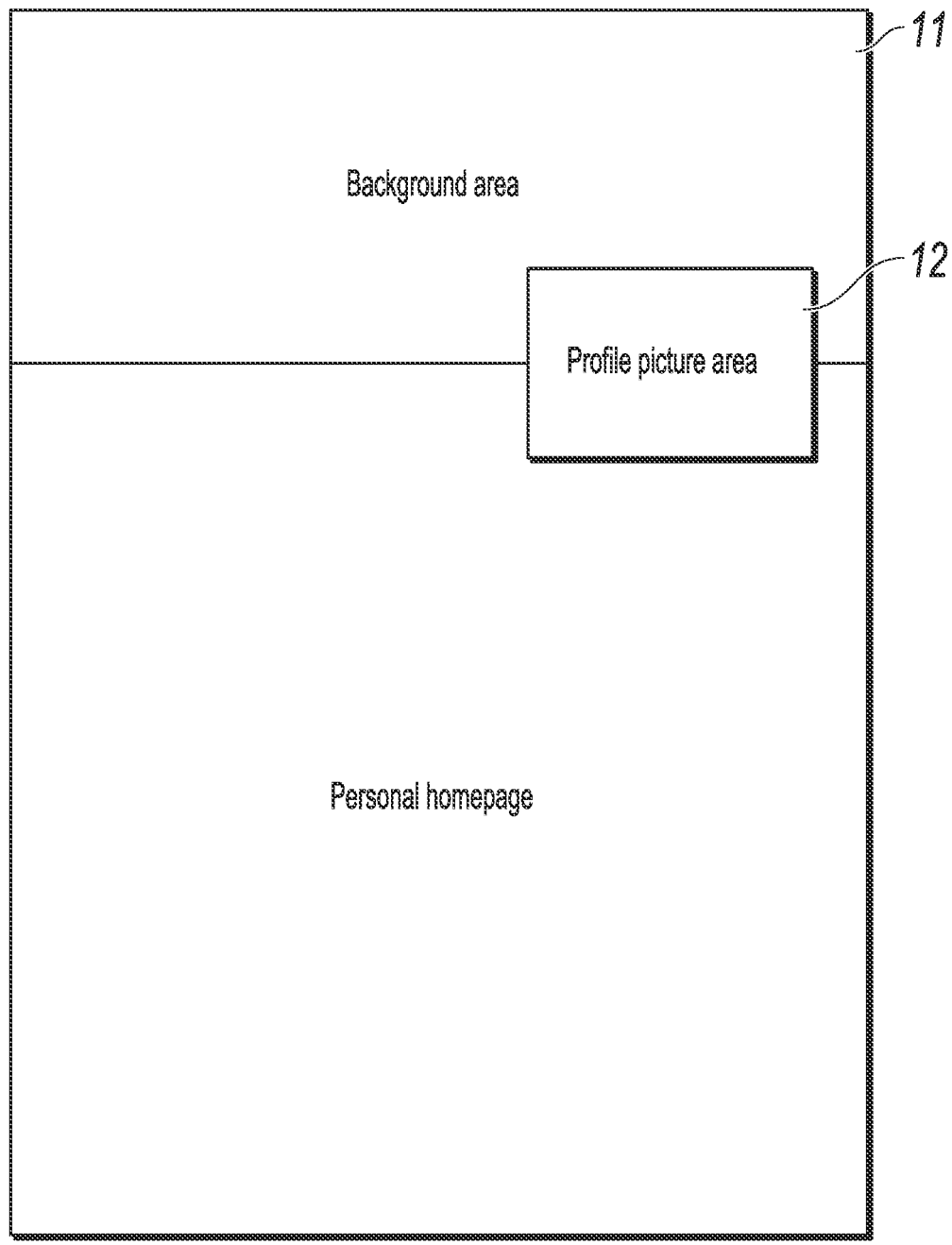
FIG. 1 is a schematic diagram illustrating a personal homepage in the existing technology.
Figure 2:
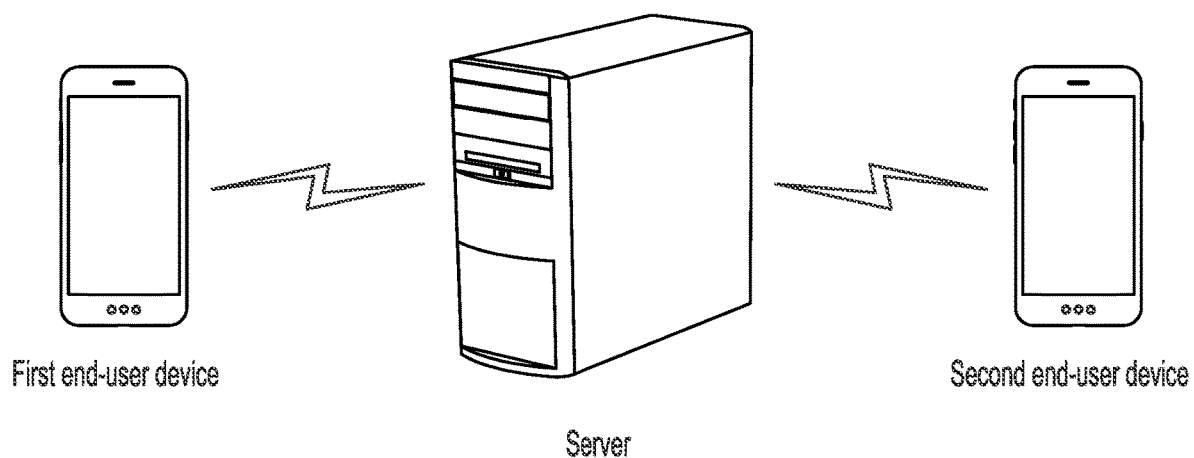
FIG. 2 is a schematic diagram illustrating a display scenario of a personal homepage, according to an implementation of the present application.

FIG. 2 is a schematic diagram illustrating a display scenario of a personal homepage, according to an implementation of the present application.

The scenario in FIG. 2 includes a first user device, a second user device, and a server. A user can create a personal homepage on the server by using the first user device and use the personal homepage. In addition, a friend of the user can log in to the server by using the second user device, to browse the personal homepage used by the user.

In the present application, the personal homepage provides a personal status display mode, and provides a control button used to enable or disable the personal status display mode, so that the user of the personal homepage independently controls whether to display a current activity status. If the personal status display mode of the personal homepage is enabled, current activity status information of the user of the personal homepage can be displayed in a background area of the personal homepage.

For example, if the user of the personal homepage is listening to a song, an album picture of the song listened to by the user of the personal homepage can be displayed in the background area of the personal homepage. If the user of the personal homepage is viewing a stock, a market picture of the stock viewed by the user of the personal homepage can be displayed in the background area of the personal homepage. If the user of the personal homepage is watching news, a synchronous video of the news watched by the user of the personal homepage can be displayed in the background area of the personal homepage.

It can be seen that after the personal status display mode of the personal homepage is enabled, a current activity status of the user of the personal homepage can be displayed in the background area of the personal homepage, so that the friend of the user can learn of the current activity status of the user of the personal homepage when opening the personal homepage, so as to easily resonate with the friend, and attract attention from more friends.

The present application is described below in detail with reference to specific implementations.

Figure 3:
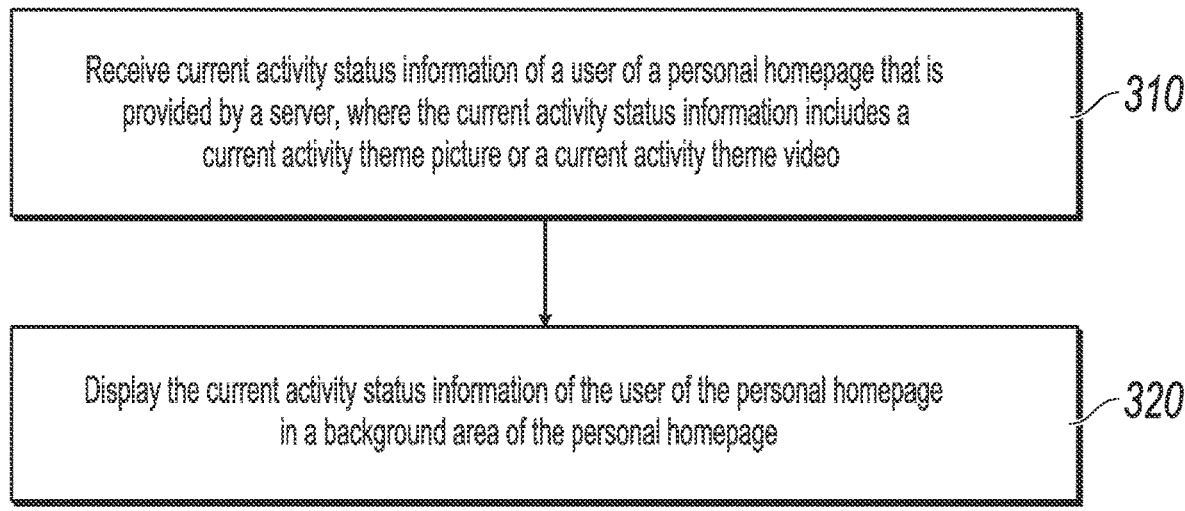
FIG. 3 is a flowchart illustrating an implementation of a method for displaying a personal homepage, according to the present application.

FIG. 3 is a flowchart illustrating an implementation of a method for displaying a personal homepage, according to the present application. The method can be applied to a user device, and the user device can be a user device used by a user who has a social relationship with a user of a personal homepage. The social relationship can include a friendship embodied through instant messaging, social software, etc. The method can include the following steps:

Step 310: Receive current activity status information of a user of a personal homepage that is provided by a server, where the current activity status information includes a current activity theme picture or a current activity theme video.

In this implementation of the present application, the server monitors a current activity status of the user of the personal homepage in real time, and sends the current activity status information of the user of the personal homepage to a user device, so that the user device synchronously displays the current activity status information of the user of the personal homepage in a background area of the personal homepage.

Step 320: Display the current activity status information of the user of the personal homepage in a background area of the personal homepage.

In this implementation of the present application, both the current activity theme picture and the current activity theme video in the current activity status information can represent an activity of the user of the personal homepage.

For example, if the user of the personal homepage is listening to a song, the activity of the user of the personal homepage can be presented by an album picture of the song listened to by the user. If the user of the personal homepage is viewing a stock, the activity of the user of the personal homepage can be represented by a market picture of the stock viewed by the user. If the user of the personal homepage is watching news, the activity of the user of the personal homepage can be represented by a synchronous video of the news watched by the user.

It can be seen from the previous implementation that the current activity status information of the user of the personal homepage is displayed in the background area of the personal homepage, to help a viewer intuitively learn of the activity of the user of the personal homepage from the personal homepage, thereby preventing the viewer from learning of the activity of the user of the personal homepage through another channel, and saving system resources.

Figure 4:
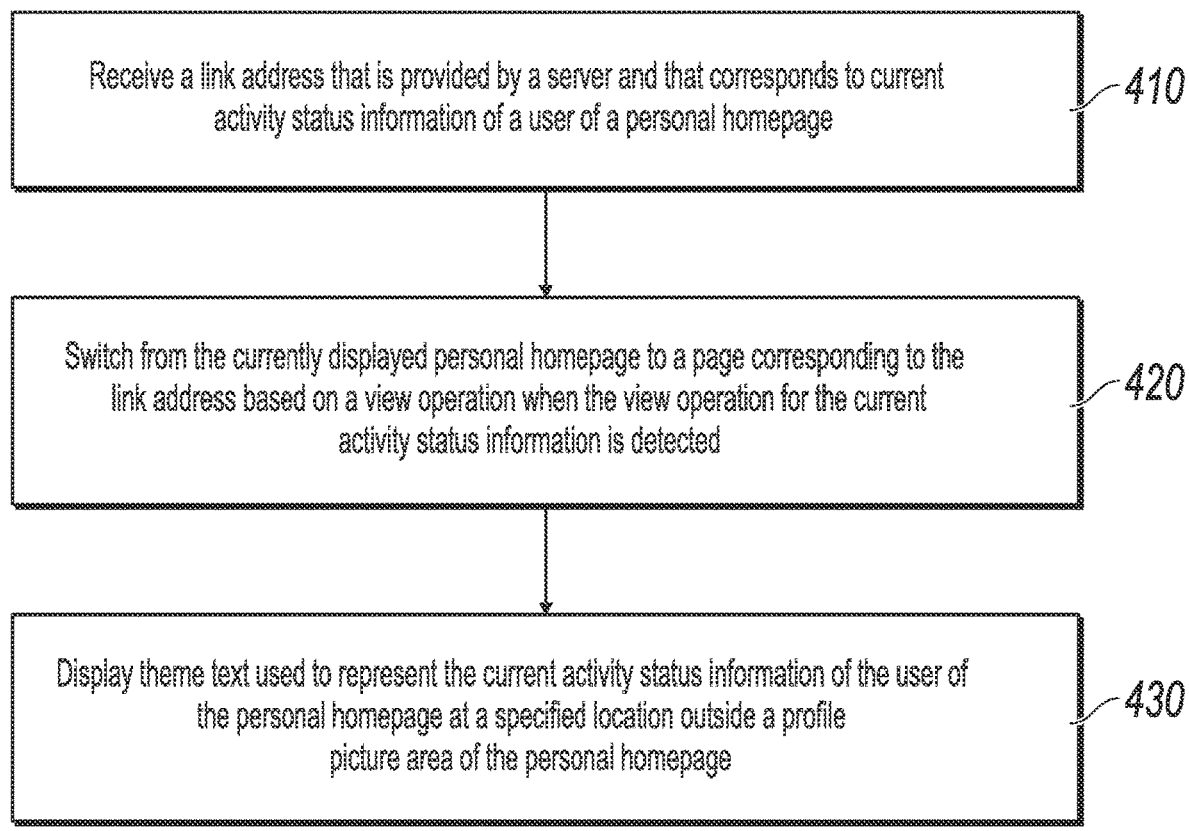
FIG. 4 is a flowchart illustrating another implementation of a method for displaying a personal homepage, according to the present application.

FIG. 4 is a flowchart illustrating another implementation of a method for displaying a personal homepage, according to the present application. The method can be applied to a user device, and the method is based on FIG. 3. The method can further include the following steps:

Step 410: Receive a link address that is provided by a server and that corresponds to current activity status information of a user of a personal homepage.

For example, if the user of the personal homepage is listening to a song, the server further provides an address of an album picture of the song listened to by the user. If the user of the personal homepage is viewing a stock, the server further provides a web site of the stock viewed by the user. If the user of the personal homepage is watching news, the server further provides a website address of the news watched by the user.

Step 420: Switch from the currently displayed personal homepage to a page corresponding to the link address based on a view operation when the view operation for the current activity status information is detected, where the view operation can be a tap or touch operation for a background area of the personal homepage.

For example, an album picture of a song listened to by the user of the personal homepage is being displayed in the background area of the personal homepage. A viewer can tap the album picture after viewing the picture. In this case, the viewer reads an address of the album picture, switches from the currently displayed personal homepage to a page corresponding to the address of the album picture, and directly plays the song listened to by the user of the personal homepage.

It can be seen from the previous implementation that the link address that is provided by the server and that corresponds to the current activity status information of the user of the personal homepage is received, and the currently displayed personal homepage is switched to the page corresponding to the link address based on the view operation when the view operation for the current activity status information is detected. As such, the viewer can jump to a page of content that the user of the personal homepage current concerns about, thereby satisfying the viewer's need to further learn of an activity of the user of the personal homepage.

In an implementation, the method for displaying a personal homepage further includes the following step:

Step 430: Display theme text used to represent the current activity status information of the user of the personal homepage at a specified location outside a profile picture area of the personal homepage.

In this implementation of the present application, the theme text can be a short piece of text information, and can be directly displayed, or can be displayed through scrolling.

For example, if the user of the personal homepage is listening to a song, the theme text can be a name of the song listened to by the user. If the user of the personal homepage is viewing a stock, the theme text can be a name of the stock viewed by the user. If the user of the personal homepage is watching news, the theme text can be a headline of the news watched by the user.

It can be seen from the previous implementation that the theme text used to represent the current activity status information of the user of the personal homepage is displayed at the specified location outside the profile picture area of the personal homepage, so that a display style of the personal homepage is enriched, and an access frequency of the personal homepage is improved.

Figure 5:
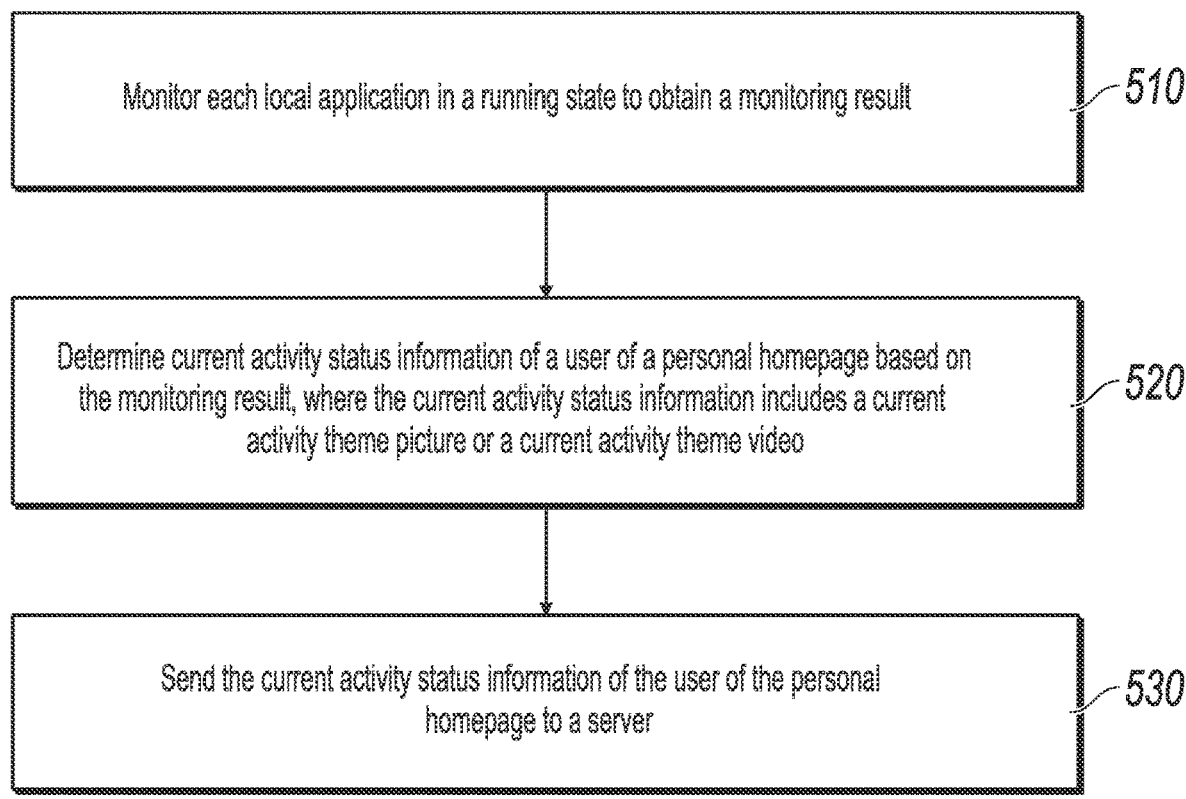
FIG. 5 is a flowchart illustrating an implementation of a method for displaying a personal homepage, according to the present application.

FIG. 5 is a flowchart illustrating an implementation of a method for displaying a personal homepage, according to the present application. The method can be applied to a user device, and the user device can be a user device used by a user of a personal homepage. The method can include the following steps.

Step 510: Monitor each local application in a running state to obtain a monitoring result.

In this implementation of the present application, applications in a running state can include an application running in a foreground, and can further include an application running in a background.

A running interface of an application running in the foreground is displayed on a display screen of a user device. For example, the user of the personal homepage uses QQ to chat with a friend. In this case, QQ is running in the foreground.

A running interface of an application running in the background is not displayed on the display screen of the user device, and instead, the running interface of the application is minimized to a status bar. For example, the user of the personal homepage listens to a song through KuGou, and minimizes the KuGou application. In this case, KuGou is running in the background.

In this implementation of the present application, the monitoring result can include a quantity of applications running in the foreground, a quantity of applications running in the background, a current execution status and running interface of each application, etc.

For example, the user of the personal homepage uses QQ to chat with a friend, and uses KuGou to listen to a song at the same time. In this case, the monitoring result includes a fact that QQ is running in the foreground and a current running interface of QQ, and content of a chat between the user of the personal homepage and the friend is displayed in the interface. The monitoring result further includes a fact that KuGou is running in the background and a current execution status of KuGou, and the status includes a name, an album picture, etc. of a song being played.

In addition, the monitoring result can further include an execution status, a running interface, etc. of different function units in a same application.

Step 520: Determine current activity status information of a user of a personal homepage based on the monitoring result, where the current activity status information includes a current activity theme picture or a current activity theme video.

Step 530: Send the current activity status information of the user of the personal homepage to a server.

In an implementation, the method for displaying a personal homepage further includes: determining a link address corresponding to the current activity status information of the user of the personal homepage based on the monitoring result; and sending the link address corresponding to the current activity status information to the server.

It can be seen from the previous implementation that each local application in a running state is monitored to obtain the monitoring result, the current activity status information of the user of the personal homepage is determined based on the monitoring result, and the current activity status information of the user of the personal homepage is sent to the server, so that the server can provide a viewer with the current activity status information of the user of the personal homepage, thereby preventing the viewer from learning of an activity of the user of the personal homepage through another channel, and saving system resources.

Figure 6:
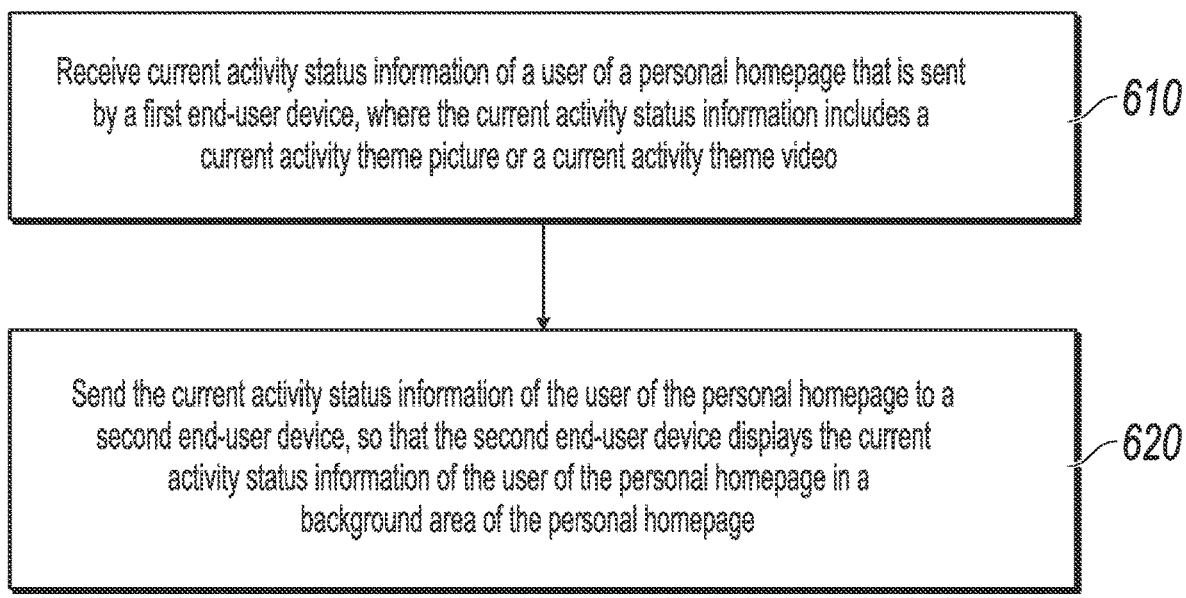
FIG. 6 is a flowchart illustrating an implementation of a method for displaying a personal homepage, according to the present application.

FIG. 6 is a flowchart illustrating an implementation of a method for displaying a personal homepage, according to the present application. The method can be applied to a server, and the method can include the following steps.

Step 610: Receive current activity status information of a user of a personal homepage that is sent by a first user device, where the current activity status information includes a current activity theme picture or a current activity theme video, and the first user device is a user device used by the user of the personal homepage.

Step 620: Send the current activity status information of the user of the personal homepage to a second user device, so that the second user device displays the current activity status information of the user of the personal homepage in a background area of the personal homepage, where the second user device can be a user device used by a user who has a social relationship with the user of the personal homepage, and the social relationship can include a friendship embodied through instant messaging, social software, etc.

In this implementation of the present application, the server monitors a current activity status of the user of the personal homepage in real time, and sends the current activity status information of the user of the personal homepage to the second user device, so that the second user device synchronously displays the current activity status information of the user of the personal homepage in the background area of the personal homepage.

For example, when detecting that the user of the personal homepage starts a song application (APP) to listen to song A, the user device used by the user of the personal homepage sends an album picture of song A to the server.

In an implementation, the method for displaying a personal homepage further includes: receiving a link address that is sent by the first user device and that corresponds to the current activity status information of the user of the personal homepage; binding the current activity status information of the user of the personal homepage to the corresponding link address; and sending the bound link address to the second user device.

It can be seen from the previous implementation that the current activity status information of the user of the personal homepage that is sent by the first user device is received, and the current activity status information of the user of the personal homepage is sent to the second user device, so that the second user device displays the current activity status information of the user of the personal homepage in the background area of the personal homepage, to help a viewer intuitively learn of an activity of the user of the personal homepage from the personal homepage, thereby preventing the viewer from learning of the activity of the user of the personal homepage through another channel, and saving system resources.

Figure 7:
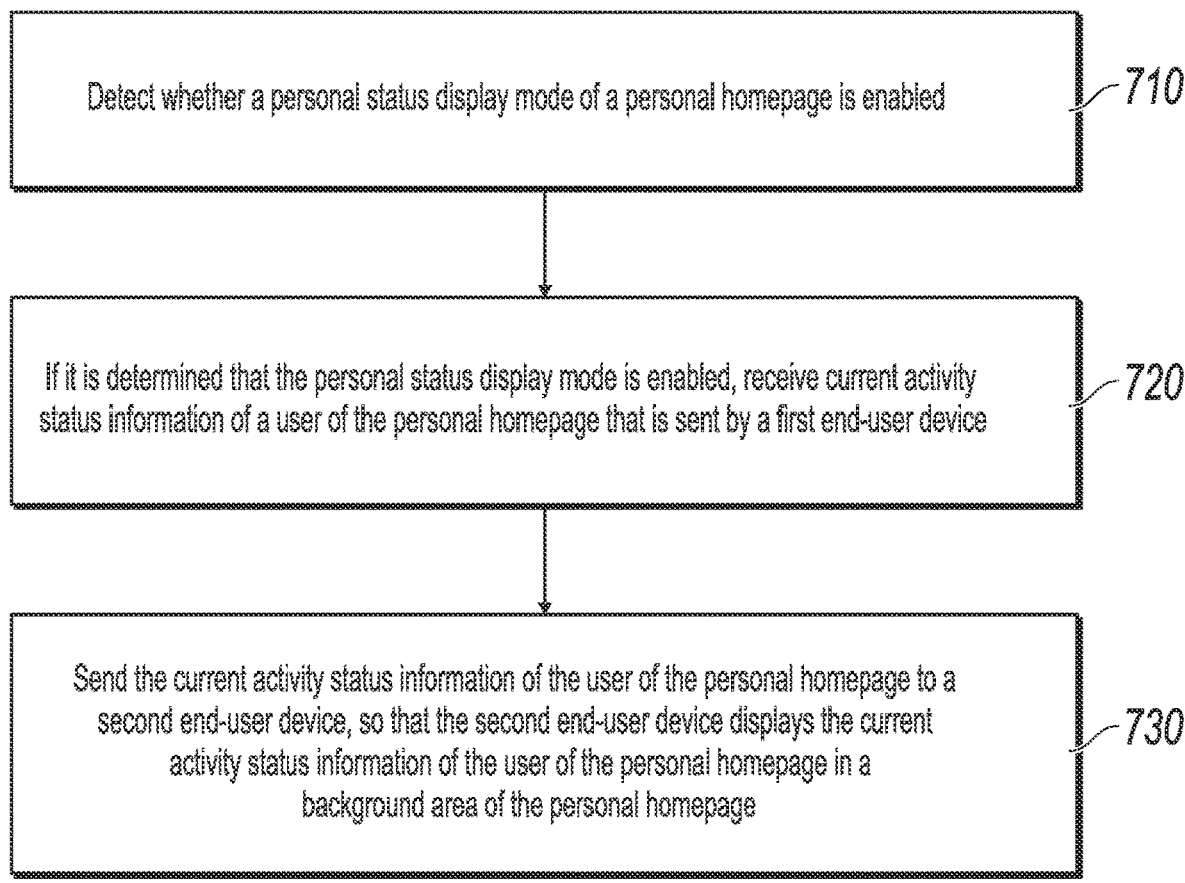
FIG. 7 is a flowchart illustrating another implementation of a method for displaying a personal homepage, according to the present application.

FIG. 7 is a flowchart illustrating another implementation of a method for displaying a personal homepage, according to the present application. The method can be applied to a server, and the method can include the following steps:

Step 710: Detect whether a personal status display mode of a personal homepage is enabled.

In this implementation of the present application, the personal status display mode is used to represent that current activity status information of a user of the personal homepage can be displayed in a background area of the personal homepage.

In addition, enabling and disabling of the personal status display mode can be controlled by the user of the personal homepage.

Step 720: If it is determined that the personal status display mode is enabled, receive current activity status information of a user of the personal homepage that is sent by a first user device.

In this implementation of the present application, the current activity status information is used to represent a current status of the user of the personal homepage. For example, the user of the personal homepage listens to a song, browses a web page, views a video online, and so on by using a smartphone.

Step 730: Send the current activity status information of the user of the personal homepage to a second user device, so that the second user device displays the current activity status information of the user of the personal homepage in a background area of the personal homepage.

It can be seen from the previous implementation that the current activity status information of the user of the personal homepage can be obtained if the personal status display mode of the personal homepage is enabled, and the current activity status information of the user of the personal homepage is sent to the second user device, so that the second user device displays the current activity status information of the user of the personal homepage in the background area of the personal homepage, to help a viewer intuitively learn of an activity of the user of the personal homepage from the personal homepage, thereby preventing the viewer from learning of the activity of the user of the personal homepage through another channel, and saving system resources.

Corresponding to the implementation of the method for displaying a personal homepage in the present application, the present application further provides an implementation of an apparatus for displaying a personal homepage.

Figure 8:
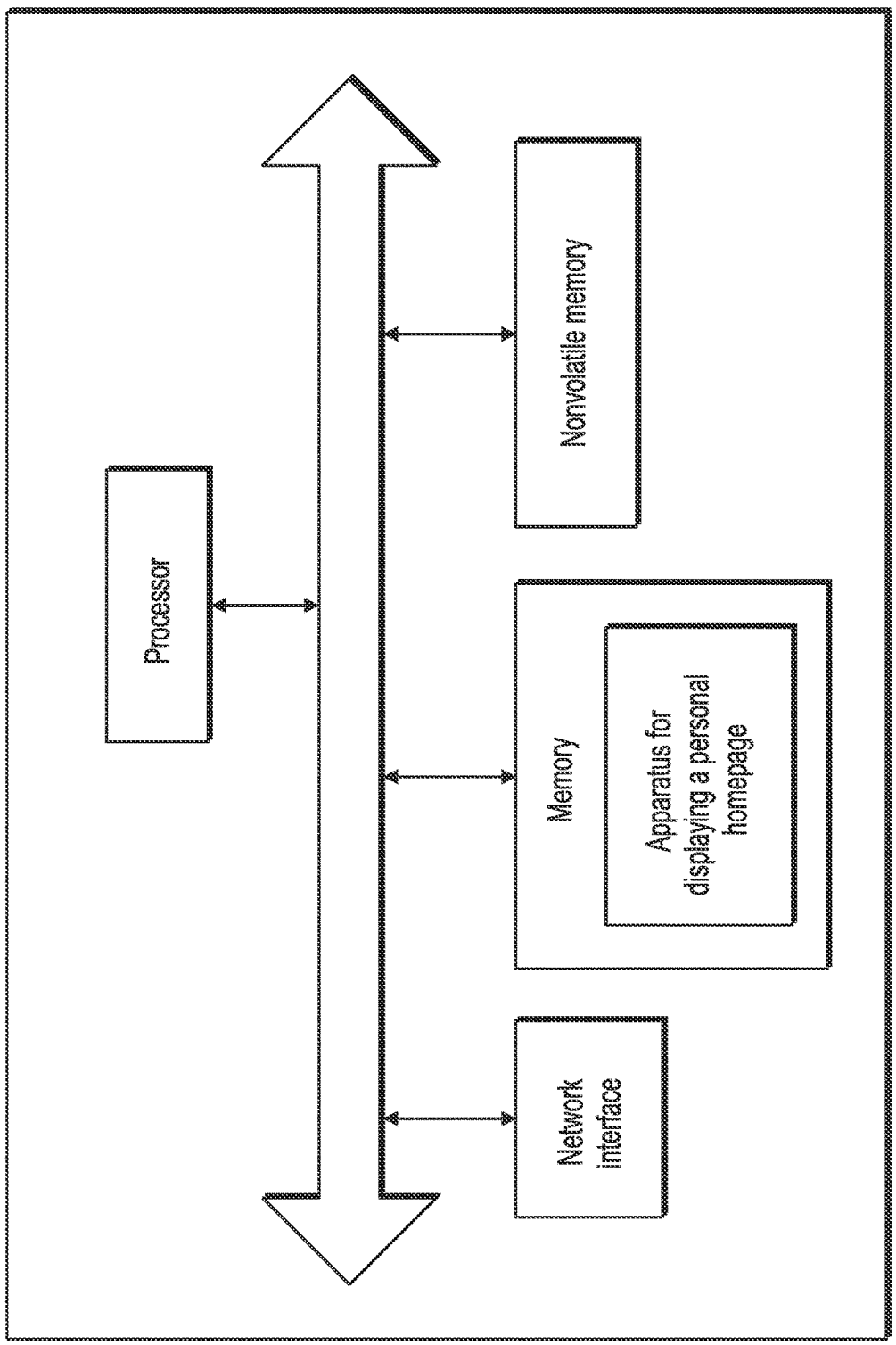
FIG. 8 is a diagram illustrating a hardware structure of an apparatus for displaying a personal homepage, according to the present application.

The implementation of the apparatus for displaying a personal homepage in the present application can be separately applied to a user device or a server. The apparatus implementation can be implemented by software, hardware, or a combination of software and hardware. Software implementation is used as an example. As a logical apparatus, the apparatus is formed by reading a corresponding computer program instruction in a nonvolatile memory to a memory by a processor of a device where the apparatus is located. In terms of hardware, FIG. 8 is a diagram of a hardware structure of a device where the apparatus for displaying a personal homepage in the present application is located. In addition to a processor, a memory, a network interface, and a nonvolatile memory shown in FIG. 8, the device where the apparatus in this implementation is located can include other hardware based on actual functions of the device. For example, for a user device, the device can include a camera, a touchscreen, a communications component, etc.; and for a server, the device can include a forwarding chip, etc. that is responsible for processing packets.

Figure 9:
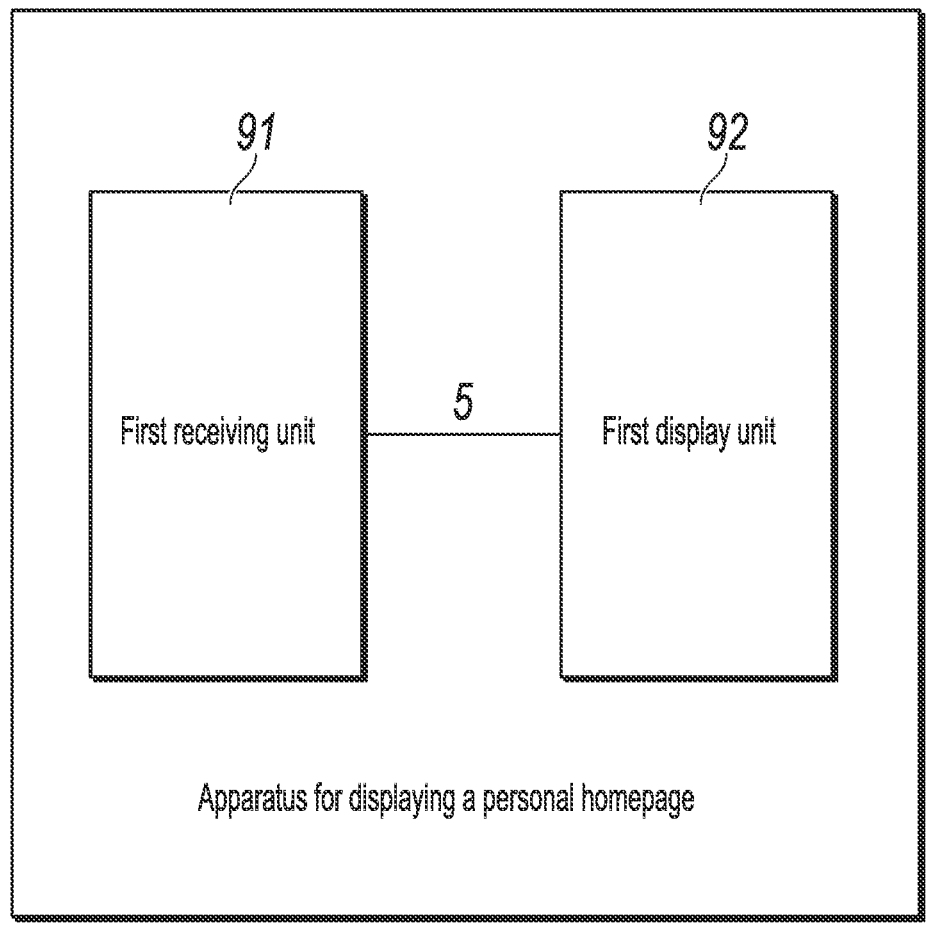
FIG. 9 is a block diagram illustrating an implementation of an apparatus for displaying a personal homepage, according to the present application.

FIG. 9 is a block diagram illustrating an implementation of an apparatus for displaying a personal homepage, according to the present application. The apparatus for displaying a personal homepage can be applied to a user device, and can be configured to perform the method for displaying a personal homepage shown in FIG. 3. The apparatus includes a first receiving unit 91 and a first display unit 92.

The first receiving unit 91 is configured to receive current activity status information of a user of a personal homepage that is provided by a server, where the current activity status information includes a current activity theme picture or a current activity theme video.

The first display unit 92 is configured to display the current activity status information in a background area of the personal homepage.

It can be seen from the previous implementation that the current activity status information of the user of the personal homepage is displayed in the background area of the personal homepage, to help a viewer intuitively learn of an activity of the user of the personal homepage from the personal homepage, thereby preventing the viewer from learning of the activity of the user of the personal homepage through another channel, and saving system resources.

In an optional implementation, the apparatus can further include a second receiving unit, a binding unit, and a switching unit (not shown in FIG. 9).

The second receiving unit is configured to receive a link address that is provided by the server and that is bound to the current activity status information.

The switching unit is configured to switch from the currently displayed personal homepage to a page corresponding to the link address based on a view operation when the view operation for the current activity status information is detected.

The view operation can be a tap or touch operation for the background area of the personal homepage.

In another optional implementation, the apparatus can further include a second display unit (not shown in FIG. 9).

The second display unit is configured to display theme text used to represent the current activity status information at a specified location outside a profile picture area of the personal homepage.

It can be seen from the previous implementation that the current activity status information of the user of the personal homepage is displayed in the background area of the personal homepage, to help a viewer intuitively learn of an activity of the user of the personal homepage from the personal homepage, thereby preventing the viewer from learning of the activity of the user of the personal homepage through another channel, and saving system resources.

Figure 10:
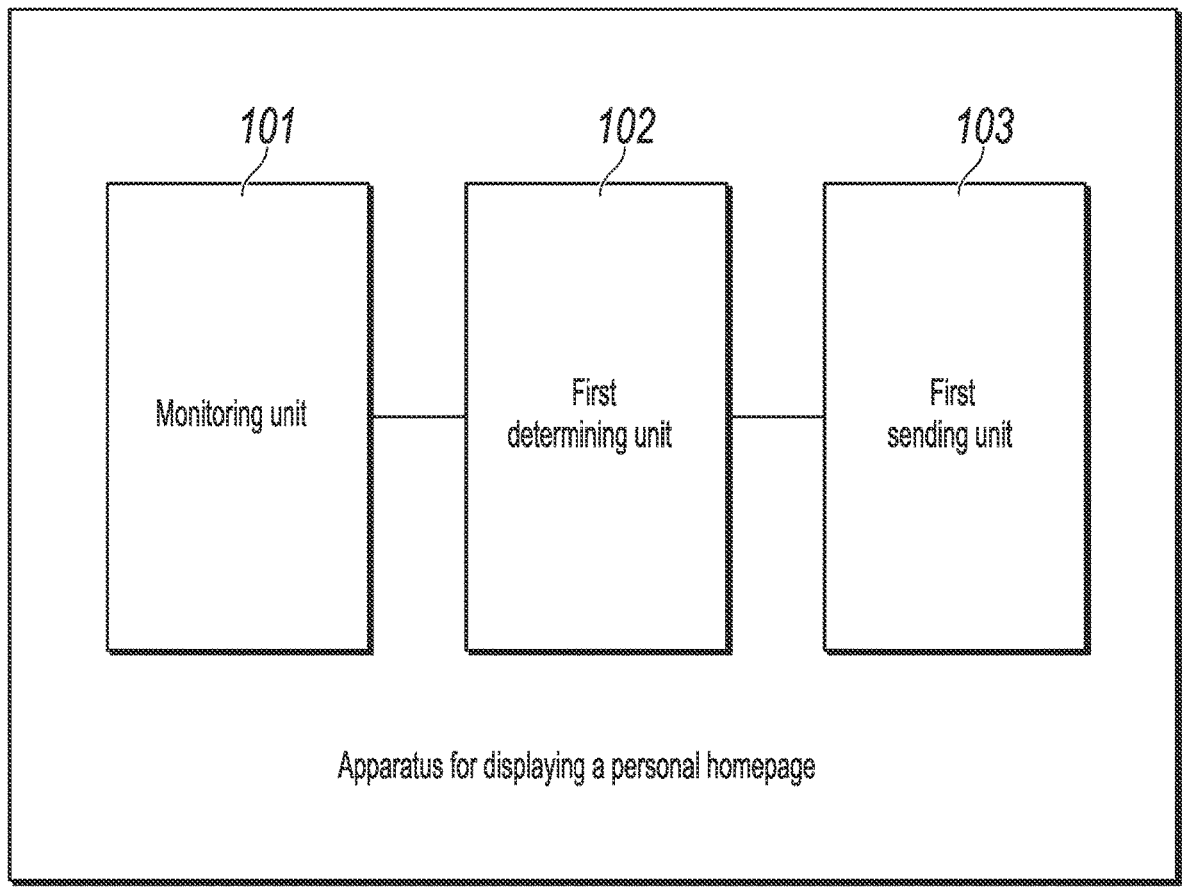
FIG. 10 is a block diagram illustrating an implementation of an apparatus for displaying a personal homepage, according to the present application.

FIG. 10 is a block diagram illustrating an implementation of an apparatus for displaying a personal homepage, according to the present application. The apparatus for displaying a personal homepage can be applied to a user device, and can be configured to perform the method for displaying a personal homepage shown in FIG. 5. The apparatus includes a monitoring unit 101, a first determining unit 102, and a first sending unit 103.

The monitoring unit 101 is configured to monitor each local application in a running state to obtain a monitoring result.

The first determining unit 102 is configured to determine current activity status information of a user of a personal homepage based on the monitoring result, where the current activity status information includes a current activity theme picture or a current activity theme video.

The first sending unit 103 is configured to send the current activity status information to a server.

It can be seen from the previous implementation that each local application in a running state is monitored to obtain the monitoring result, the current activity status information of the user of the personal homepage is determined based on the monitoring result, and the current activity status information of the user of the personal homepage is sent to the server, so that the server can provide a viewer with the current activity status information of the user of the personal homepage, thereby preventing the viewer from learning of an activity of the user of the personal homepage through another channel, and saving system resources.

In an optional implementation, the apparatus can further include a second determining unit and a second sending unit (not shown in FIG. 10).

The second determining unit is configured to determine a link address corresponding to the current activity status information based on the monitoring result.

The second sending unit is configured to send the corresponding link address to the server.

Figure 11:
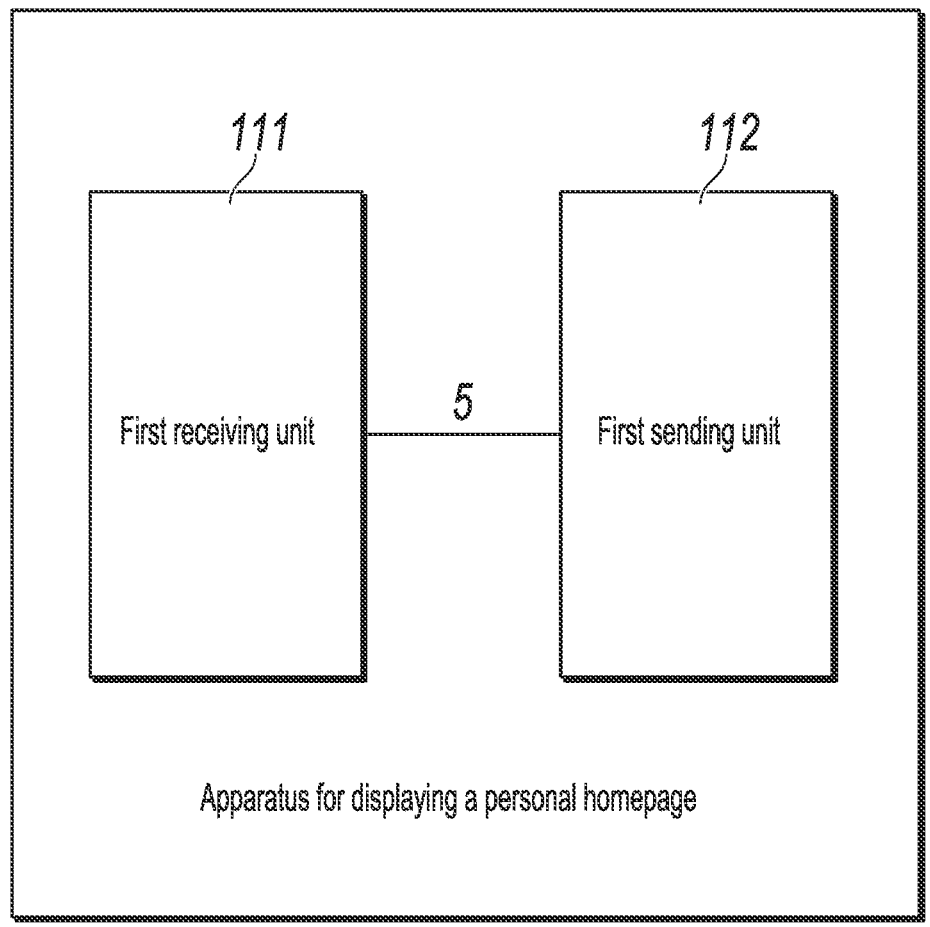
FIG. 11 is a block diagram illustrating an implementation of an apparatus for displaying a personal homepage, according to the present application.

FIG. 11 is a block diagram illustrating an implementation of an apparatus for displaying a personal homepage, according to the present application. The apparatus for displaying a personal homepage can be applied to a server, and can be configured to perform the method for displaying a personal homepage shown in FIG. 6. The apparatus includes a first receiving unit 111 and a first sending unit 112.

The first receiving unit 111 is configured to receive current activity status information of a user of a personal homepage that is sent by a first user device, where the current activity status information includes a current activity theme picture or a current activity theme video.

The first sending unit 112 is configured to send the current activity status information to a second user device, so that the second user device displays the current activity status information in a background area of the personal homepage.

It can be seen from the previous implementation that the current activity status information of the user of the personal homepage is obtained, and the current activity status information of the user of the personal homepage is sent to the second user device, so that the second user device displays the current activity status information of the user of the personal homepage in the background area of the personal homepage, to help a viewer intuitively learn of an activity of the user of the personal homepage from the personal homepage, thereby preventing the viewer from learning of the activity of the user of the personal homepage through another channel, and saving system resources.

In an optional implementation, the apparatus can further include a second receiving unit, a binding unit, and a second unit (not shown in FIG. 11).

The second receiving unit is configured to receive a link address that is sent by the first user device and that corresponds to the current activity status information.

The binding unit is configured to bind the current activity status information to the corresponding link address.

The second sending unit is configured to send the bound link address to the second user device.

In another optional implementation, the first receiving unit 111 can include a connection subunit (not shown in FIG. 11).

The connection subunit is configured to: when it is determined that a personal status display mode of the personal homepage is enabled, receive the current activity status information of the user of the personal homepage that is sent by the first user device.

Because an apparatus implementation basically corresponds to a method implementation, for related parts, references can be made to related descriptions in the method implementation. The previously described apparatus implementation is merely an example. The units described as separate parts may or may not be physically separate. Parts displayed as units may or may not be physical units, and may be located in one position, or may be distributed on a plurality of network units. Some or all of the modules can be selected based on actual demands to achieve the objectives of the solutions of the present application. A person of ordinary skill in the art can understand and implement the implementations of the present application without creative efforts.

In addition, the apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to FIG. 9, an implementation of the present application further provides a user device, and the user device includes: at least one processor; and a memory configured to store an instruction that can be executed by the at least one processor.

The at least one processor is configured to: receive current activity status information of a user of a personal homepage that is provided by a server, where the current activity status information includes a current activity theme picture or a current activity theme video; and display the current activity status information in a background area of the personal homepage.

It can be seen from the previous implementation that the current activity status information of the user of the personal homepage is displayed in the background area of the personal homepage, to help a viewer intuitively learn of an activity of the user of the personal homepage from the personal homepage, thereby preventing the viewer from learning of the activity of the user of the personal homepage through another channel, and saving system resources.

Corresponding to FIG. 10, an implementation of the present application further provides a user device, and the user device includes: at least one processor; and a memory configured to store an instruction that can be executed by the at least one processor.

The at least one processor is configured to: monitor each local application in a running state to obtain a monitoring result; determine current activity status information of a user of a personal homepage based on the monitoring result, where the current activity status information includes a current activity theme picture or a current activity theme video; and send the current activity status information to a server.

It can be seen from the previous implementation that each local application in a running state is monitored to obtain the monitoring result, the current activity status information of the user of the personal homepage is determined based on the monitoring result, and the current activity status information of the user of the personal homepage is sent to the server, so that the server can provide a viewer with the current activity status information of the user of the personal homepage, thereby preventing the viewer from learning of an activity of the user of the personal homepage through another channel, and saving system resources.

Corresponding to FIG. 11, an implementation of the present application further provides a server, and the server includes: at least one processor; and a memory configured to store an instruction that can be executed by the at least one processor.

The at least one processor is configured to: receive current activity status information of a user of a personal homepage that is sent by a first user device, where the current activity status information includes a current activity theme picture or a current activity theme video; and send the current activity status information to a second user device, so that the second user device displays the current activity status information in a background area of the personal homepage.

It can be seen from the previous implementation that the current activity status information of the user of the personal homepage is obtained, and the current activity status information of the user of the personal homepage is sent to the second user device, so that the second user device displays the current activity status information of the user of the personal homepage in the background area of the personal homepage, to help a viewer intuitively learn of an activity of the user of the personal homepage from the personal homepage, thereby preventing the viewer from learning of the activity of the user of the personal homepage through another channel, and saving system resources.

A person skilled in the art can easily figure out another implementation solution of the present application after considering the present specification and practicing the present disclosure here. The present application is intended to cover any variations, functions, or adaptive changes of the present application. These variations, functions, or adaptive changes comply with general principles of the present application, and include common knowledge or a commonly used technical means in the technical field that is not disclosed in the present application. The present specification and the implementations are merely considered as examples. The actual scope and the spirit of the present application are pointed out by the following claims.

It should be understood that the present application is not limited to the accurate structures described above and shown in the accompanying drawings, and various modifications and changes can be made without departing from the scope of the present application. The scope of the present application is limited only by the appended claims.

Figure 12:
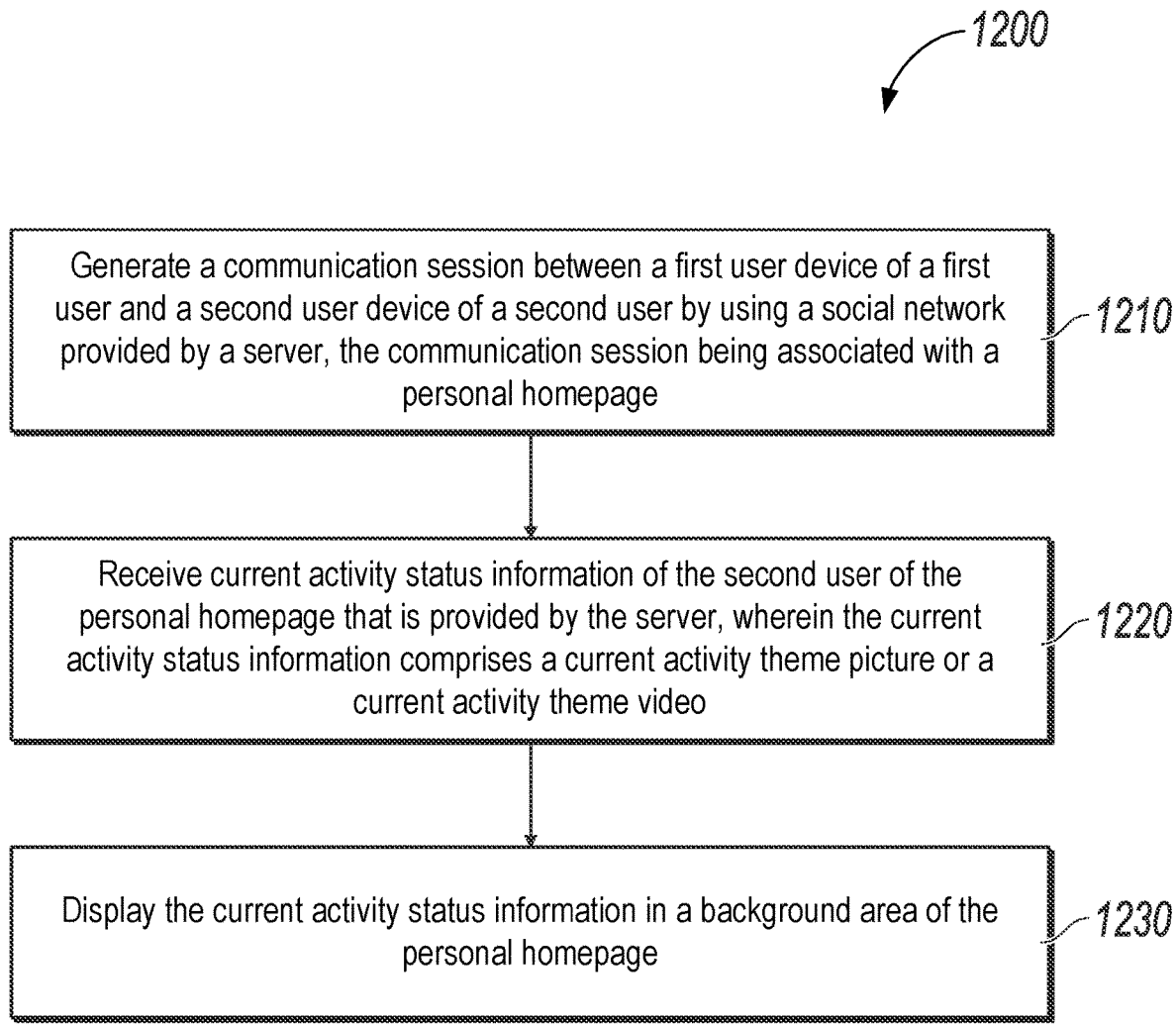
FIG. 12 is a flowchart illustrating an example of a computer-implemented method for displaying a personal homepage, according to an implementation of the present disclosure.

FIG. 12 is a flowchart illustrating an example of a computer-implemented method 1200 for displaying a personal homepage, according to an implementation of the present disclosure. For clarity of presentation, the description that follows generally describes method 1200 in the context of the other figures in this description. However, it will be understood that method 1200 can be performed, for example, by any system, environment, software, and hardware, or a combination of systems, environments, software, and hardware, as appropriate. In some implementations, various steps of method 1200 can be run in parallel, in combination, in loops, or in any order.

At 1210, a communication session is generated by a first user device of a first user between the first user device and a second user device of a second user by using a social network provided by a server, the communication session being associated with a personal homepage;

At 1220, current activity status information of the second user of the personal homepage that is provided by the server is received by the first user device of the first user, wherein the current activity status information comprises a current activity theme picture or a current activity theme video; and At 1230, the current activity status information is displayed by the first user device of the first user in a background area of the personal homepage.

In some implementations, the process 1200 includes receiving a link address that is provided by the server and that is bound to the current activity status information; and switching from the personal homepage to a page corresponding to the link address based on a view operation when the view operation for the current activity status information is detected. In some cases, the view operation is a tap or touch operation for the background area of the personal homepage.

In some cases, the process 1200 includes displaying theme text used to represent the current activity status information at a specified location outside a profile picture area of the personal homepage.

In some implementations, the process 1200 includes monitoring each local application in a running state to obtain a monitoring result; determining first current activity status information of the first user of the personal homepage based on the monitoring result; and sending the first current activity status information to the server.

In some cases, the process 1200 includes determining a link address corresponding to the first current activity status information based on the monitoring result; and sending the link address to the server.

In some implementations, the process 1200 includes sending the first current activity status information to the second user device, so that the second user device displays the first current activity status information in the background area of the personal homepage.

In some implementations, the process 1200 includes receiving a second link address that is sent by the second user device and that corresponds to the current activity status information; binding the current activity status information to the second link address as a bound link address; and sending the bound link address to the first user device.

In some cases, the personal homepage provides a control button configured to enable or disable a personal status display mode, so that the second user of the personal homepage independently controls whether to display a current activity status. In some implementations, receiving the current activity status information includes determining whether the personal status display mode of the personal homepage is enabled; and in response to determining that the personal status display mode of the personal homepage is enabled, receiving the current activity status information of the second user of the personal homepage that is sent by the second user device.

The techniques described herein produce one or more technical effects. For example, the techniques improve the operation of a computing device participating in a social network by enabling the device to provide current activity status information for inclusion in a personal home page of the user of the device. The techniques also improve the operation of the device by enabling it to receive and display current activity status information included in the personal home pages of other users. Further, the techniques improve the operation of the social network by enabling the devices on the network to share this current activity status information on their personal homepages.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for displaying a personal homepage, the computer-implemented method comprising:
   determining, by a social network server, that a posting user of a social network has enabled a personal status display mode in which a theme picture that is selected by a social network server based on a current activity of the posting user, or a theme video that is selected by the social network server based on the current activity of the posting user, are to be automatically displayed in a background image region of a social network page that is associated with the posting user and that is viewable by other members of the social network;
   receiving, from a viewing user of the social network, a request to view the social network page of the posting user;
   in response to determining that the posting user of the social network has enabled the personal status display mode and in response to the request to view the social network page of the posting user by the viewing user of the social network, determining, by the social network server, a particular current activity that is based on monitoring a background application running on a user device associated with the posting user of the social network;
   selecting, by the social network server, a particular theme picture based on the particular current activity, or a particular theme video based on the particular current activity determined by monitoring the background application running on the user device associated with the posting user of the social network; and
   providing, for display to the viewing user in the background image region of the social network page that is associated with the posting user and that is viewable by other members of the social network, the particular theme picture that the social network server selected based on the particular current activity, or the particular theme video that the social network server selected based on the particular current activity.

2. The method of claim 1, wherein the particular theme picture or the particular theme video are selected by the social network server based on a link that is provided by a device associated with the posting user.

3. The method of claim 1, comprising providing a textual description of the particular current activity on another region of the social network page that is associated with the posting user.

4. The method of claim 1, wherein the particular current activity is determined based on an identity of one or more applications that are running on a user device that is associated with the posting user.

5. The method of claim 1, wherein providing, for display, the particular theme picture or the particular theme video comprises providing a link address that, when selected, switches, from display, the social media page with a page associated with the link address.

6. A non-transitory, computer-readable medium storing one or more instructions executable by a computer system to perform operations for displaying a personal homepage, the operations comprising:
   determining, by a social network server, that a posting user of a social network has enabled a personal status display mode in which a theme picture that is selected by a social network server based on a current activity of the posting user, or a theme video that is selected by the social network server based on the current activity of the posting user, are to be automatically displayed in a background image region of a social network page that is associated with the posting user and that is viewable by other members of the social network;
   receiving, from a viewing user of the social network, a request to view the social network page of the posting user;
   in response to determining that the posting user of the social network has enabled the personal status display mode and in response to the request to view the social network page of the posting user by the viewing user of the social network, determining, by the social network server, a particular current activity that is based on monitoring a background application running on a user device associated with the posting user of the social network;
   selecting, by the social network server, a particular theme picture based on the particular current activity, or a particular theme video based on the particular current activity determined by monitoring the background application running on the user device associated with the posting user of the social network; and
   providing, for display to the viewing user in the background image region of the social network page that is associated with the posting user and that is viewable by other members of the social network, the particular theme picture that the social network server selected based on the particular current activity, or the particular theme video that the social network server selected based on the particular current activity.

7. The medium of claim 6, wherein the particular theme picture or the particular theme video are selected by the social network server based on a link that is provided by a device associated with the posting user.

8. The medium of claim 6, wherein the operations comprise providing a textual description of the particular current activity on another region of the social network page that is associated with the posting user.

9. The medium of claim 6, wherein the particular current activity is determined based on an identity of one or more applications that are running on a user device that is associated with the posting user.

10. The medium of claim 6, wherein the particular current activity is determined based on monitoring foreground and background applications that are running on a user device that is associated with the posting user.

11. The medium of claim 6, wherein providing, for display, the particular theme picture or the particular theme video comprises providing a link address that, when selected, switches, from display, the social media page with a page associated with the link address.

12. A system comprising:
   one or more computers; and
   one or more computer memory devices interoperably coupled with the one or more computers and having tangible, non-transitory, machine-readable media storing one or more instructions that, when executed by the one or more computers, perform one or more operations for displaying a personal homepage, the operations comprising:
   determining, by a social network server, that a posting user of a social network has enabled a personal status display mode in which a theme picture that is selected by a social network server based on a current activity of the posting user, or a theme video that is selected by the social network server based on the current activity of the posting user, are to be automatically displayed in a background image region of a social network page that is associated with the posting user and that is viewable by other members of the social network;

receiving, from a viewing user of the social network, a request to view the social network page of the posting user;

in response to determining that the posting user of the social network has enabled the personal status display mode and in response to the request to view the social network page of the posting user by the viewing user of the social network, determining, by the social network server, a particular current activity that is based on monitoring a background application running on a user device associated with the posting user of the social network;

selecting, by the social network server, a particular theme picture based on the particular current activity, or a particular theme video based on the particular current activity determined by monitoring the background application running on the user device associated with the posting user of the social network; and providing, for display to the viewing user in the background image region of the social network page that is associated with the posting user and that is viewable by other members of the social network, the particular theme picture that the social network server selected based on the particular current activity, or the particular theme video that the social network server selected based on the particular current activity.

13. The system of claim 12, wherein the particular theme picture or the particular theme video are selected by the social network server based on a link that is provided by a device associated with the posting user.

14. The system of claim 12, wherein the operations comprise providing a textual description of the particular current activity on another region of the social network page that is associated with the posting user.

15. The system of claim 12, wherein the particular current activity is determined based on an identity of one or more applications that are running on a user device that is associated with the posting user.

16. The system of claim 12, wherein the particular current activity is determined based on monitoring foreground and background applications that are running on a user device that is associated with the posting user.

* * * * *